W. H. HALLECK.
Plant Protector.
No. 84,692. Patented Dec. 8, 1868.
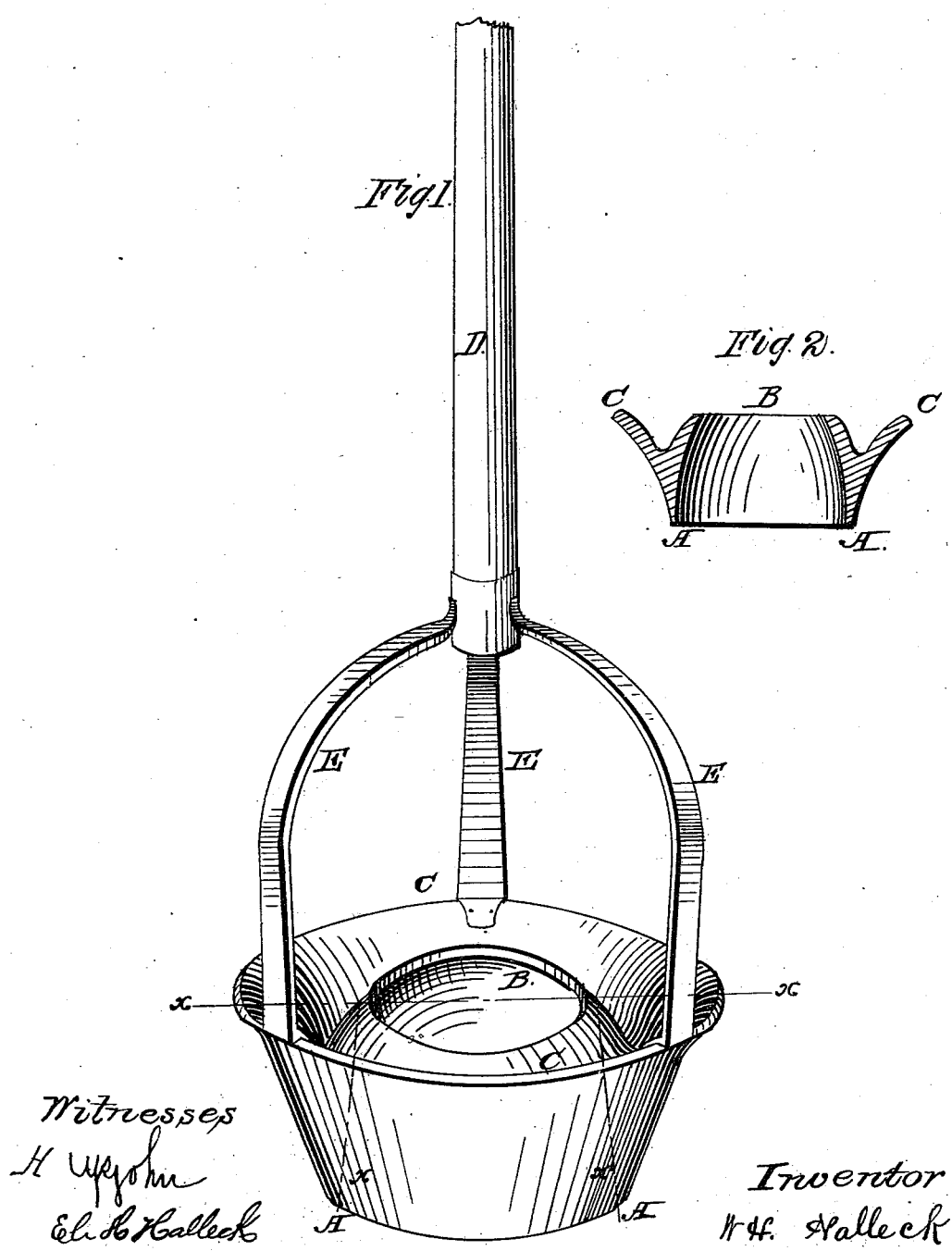

W. H. HALLECK, OF ANN ARBOR, MICHIGAN.

Letters Patent No. 84,692, dated December 8, 1868.

IMPROVEMENT IN IMPLEMENT FOR TRENCHING AROUND PLANTS, TO PREVENT THE APPROACH OF WORMS.

The Schedule referred to in these Letters Patent and making part of the same.

*To all whom it may concern:*

Be it known that I, W. H. HALLECK, of Ann Arbor, in the county of Washtenaw, in the State of Michigan, have invented a certain new and useful Implement for Forming a Trench Around Plants, to Prevent the Approach of Worms or other enemies; and I do hereby declare that the following is a full and exact description thereof, reference being had to the accompanying drawings, and to the letters of reference marked thereon, in which—

Figure 1 is a perspective view.

Figure 2 is a vertical section through the lines $x\,x\,x\,x$.

The nature of my invention consists in constructing a circular stamp, of iron or other metal, with its lower edge or rim A A sharp, or nearly so, and with its interior surface inclining slightly in towards the centre, from lower edge A A to top opening B, to give sufficient draught.

Its exterior flares with a slight curve from its lower edge, A A, to top rim, C C, in such a manner as to leave (when pressed into the earth and drawn out) a wedged-shaped circular trench, with its inner wall nearly perpendicular.

Said stamp is provided with handle D, which is attached, by means of arched braces of iron, E E E, to its outer rim C C.

What I claim as my invention, and desire to secure by Letters Patent, is—

The invention of an implement to prevent the cut or wire-worm from destroying corn and plants, using for that purpose the aforesaid stamp, (circular, rolling, square, sliding,) or any shape substantially the same, for the same purpose as herein set forth.

W. H. HALLECK.

Witnesses:
 H. UPJOHN,
 ELI H. HALLECK.